US 6,571,251 B1

(12) United States Patent
Koski et al.

(10) Patent No.: US 6,571,251 B1
(45) Date of Patent: *May 27, 2003

(54) CASE-BASED REASONING SYSTEM AND METHOD WITH A SEARCH ENGINE THAT COMPARES THE INPUT TOKENS WITH VIEW TOKENS FOR MATCHING CASES WITHIN VIEW

(75) Inventors: Dennis D. Koski, Rochester, MN (US); Charles Song Yop Moon, Round Rock, TX (US); Thomas Alan Shore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/001,117

(22) Filed: Dec. 30, 1997

(51) Int. Cl.[7] .................................. G06F 17/30
(52) U.S. Cl. ..................... 707/102; 707/1; 707/3; 707/5; 707/100; 707/104.1; 706/45; 706/46; 706/47
(58) Field of Search ............... 707/500, 514, 707/530–532, 1–10, 100–104.1, 200–203; 706/10, 12–13, 20, 45–50, 52, 60–61; 714/26, 37, 40

(56) References Cited

U.S. PATENT DOCUMENTS

| 5,581,664 A | | 12/1996 | Allen et al. ................ 706/46 |
|---|---|---|---|
| 5,586,218 A | * | 12/1996 | Allen .......................... 706/12 |
| 5,592,667 A | | 1/1997 | Bugajski ..................... 707/102 |
| 5,619,199 A | | 4/1997 | Watts et al. .................. 341/51 |
| 5,701,399 A | * | 12/1997 | Lee et al. ..................... 706/11 |
| 5,717,835 A | * | 2/1998 | Hellerstein ................... 706/46 |
| 5,720,001 A | * | 2/1998 | Nguyen ....................... 706/59 |
| 5,774,888 A | * | 6/1998 | Light ............................ 707/5 |
| 5,778,356 A | * | 7/1998 | Heiny ........................... 707/2 |
| 5,799,148 A | * | 8/1998 | Cuddiby et al. .............. 714/28 |
| 5,822,743 A | * | 10/1998 | Gupta et al. ................. 706/50 |
| 5,875,446 A | * | 2/1999 | Brown et al. .................. 707/3 |
| 5,887,171 A | * | 3/1999 | Tada et al. .................. 709/303 |
| 5,943,669 A | * | 8/1999 | Numata ......................... 707/5 |

\* cited by examiner

Primary Examiner—Srirama Channavajjala
(74) Attorney, Agent, or Firm—A. P. Tennent; Bracewell & Patterson, L.L.P.

(57) ABSTRACT

A case-based reasoning system includes a case database capable of storing a plurality of cases that each include one or more attributes. A view generator in the case-based reasoning system generates a view of the case database by representing each case within at least a selected subset of the plurality of cases within the case database with one or more uniform-length view tokens. An input parser in the case-based reasoning system provides a tokenized representation of an input incident that includes one or more input tokens. The case-based reasoning system further includes a search engine that compares the input tokens with the view tokens to identify one or more closely matching cases within the view. By searching the view rather than directly searching the case database, cases that closely match the input are efficiently identified.

32 Claims, 5 Drawing Sheets

| | 1 | 2 | 3 | 4 | ... | M |
|---|---|---|---|---|---|---|
| CASE 1 | P1/V1 | P2/V2 | P3/V3 | | | |
| CASE 2 | P1/V1 | P4/V4 | P5/V5 | P6/V6 | | PM/V9 |
| CASE 3 | P7/V1 | P8/V1 | P9/V1 | | | |
| ... | | | ... | | | |
| CASE N | P1/V2 | P2/V2 | P4/V1 | P10/V10 | | |

| CASE 1 WEIGHT & SCORING INFO | CASE 2 WEIGHT & SCORING INFO | CASE 3 WEIGHT & SCORING INFO | ... | CASE N WEIGHT & SCORING INFO |
|---|---|---|---|---|

CASE-BASED REASONING SYSTEM AND METHOD WITH A SEARCH ENGINE THAT COMPARES THE INPUT TOKENS WITH VIEW TOKENS FOR MATCHING CASES WITHIN VIEW

CROSS-REFERENCE TO RELATED APPLICATION

This application is related to application Ser. No. 09/001, 083, which was filed on even date herewith and entitled "Case-Based Reasoning System And Method For Scoring Cases In A Case Database".

BACKGROUND OF THE INVENTION

1. Technical Field

The present invention relates in general to expert systems and, in particular, to case-based reasoning systems. Still more particularly, the present invention relates to a case-based reasoning system that compresses selected data within a case database into a tokenized view in order to improve the efficiency of the case database search engine.

2. Description of the Related Art

A case-based reasoning (CBR) system generally refers to a computer system that identifies a solution to a current problem by examining descriptions of similar, previously encountered problems and their associated solutions, matching the current problem with one or more similar previously encountered problems, and using the associated solutions of the matching previously encountered problems to suggest a solution to the current problem. In response to receipt of a description of a current problem, a conventional CBR system retrieves the closest matching cases from a case database using a search engine and iteratively prompts the user for additional descriptive information until the retrieved case or cases identified by the search engine are sufficiently similar to the current problem to be considered as possible solutions. If a new solution (not previously stored in the case database) is subsequently validated, the validated solution can be entered into the case database and utilized to solve future problems.

Of course, the ability of a CBR system to provide solutions to input problems is limited, in part, by the number of cases stored within the case database and the number of attributes utilized to describe each case. Thus, the quality of solutions produced by a CBR system will typically improve as more cases representing additional experience are stored within the case database and as the number of attributes that may be associated with each case increases. Because a relatively well-developed case database can include several hundreds or thousands of unique cases, which may each include, for example, fifty different attributes, the technique utilized to search the case database for cases that closely match the current problem must be efficient if the CBR system is to achieve high performance while accurately identifying the best matching case for the current problem.

As should thus be apparent, it would be desirable from a performance standpoint to provide an improved method and system for searching the case database of a CBR system.

SUMMARY OF THE INVENTION

It is therefore one object of the present invention to provide an improved expert system.

It is another object of the present invention to provide an improved case-based reasoning system.

It is yet another object of the present invention to provide a case-based reasoning system that compresses selected data within a case database into a tokenized view in order to improve the efficiency of the case database search engine.

The foregoing objects are achieved as is now described. A case-based reasoning system is equipped with a case database capable of storing a plurality of cases that each include one or more attributes. A view generator in the case-based reasoning system generates a view of the case database by representing each case within at least a selected subset of the plurality of cases within the case database with one or more uniform-length view tokens. An input parser in the case-based reasoning system provides a tokenized representation of an input incident that includes one or more input tokens. The case-based reasoning system further includes a search engine that compares the input tokens with the view tokens to identify one or more closely matching cases within the view. By searching the view rather than directly searching the case database, cases that closely match the input are efficiently identified.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 illustrates a more detailed representation of the contents of the case base illustrated in FIG. 1;

DETAILED DESCRIPTION OF ILLUSTRATIVE EMBODIMENT

Figure 1:
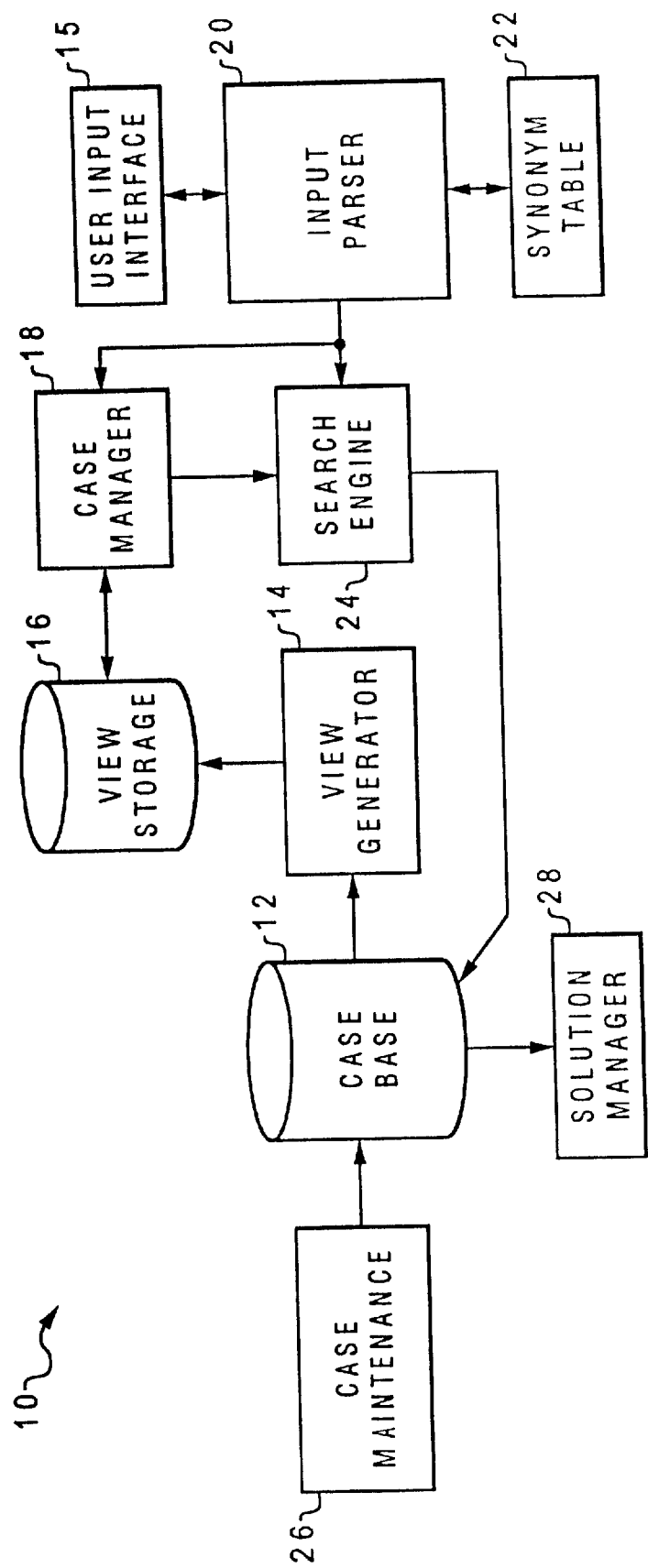
FIG. 1 depicts an illustrative embodiment of a case-based reasoning (CBR) system in accordance with the present invention.

With reference now to the figures and in particular with reference to FIG. 1, there is depicted an illustrative embodiment of a case-based reasoning (CBR) system in accordance with the present invention. As illustrated, CBR system 10 includes case base 12, which is a database for storing attributes of experiences called cases. The cases collected in case base 12 can be gathered from any endeavor in which solutions to current problems or proposed actions can be determined from relevant experience in similar past situations. Thus, the cases stored within case base 12 can relate, for example, to help desk support, sales support, customer service, medical diagnosis, engineering design, executive information systems, or the like. The cases stored within case base 12 can be organized and indexed in a number of different ways, depending upon on the type of attributes utilized to describe the cases and the logical relationship between different cases. For example, one approach is to store cases in case base 12 in a tree data structure constructed utilizing an inductive algorithm. Another conventional approach called "nearest neighbor indexing" uses developer-specified values for each attribute of each case and then calculates the degree of closeness between cases using formulas for each stored case. A third approach is to utilize a hierarchy tree of prototype cases. According to this method, a root case class is defined, and then multiple layers of abstract classes are constructed between the root case class and specific instances of cases. Finally, a method called "knowledge-guided indexing" can be employed to create subsets of cases based upon rules of reason implemented by a rule inference engine. Those skilled in the art will recognize that different schemes of case base organization may be more advantageous than others depending upon the type of cases stored in case base 12 and the capabilities of the available software tools.

Regardless of how it is physically organized, case base 12 can be viewed as a multi-dimensional database array, where each case forms a record and each case attribute is a field within a record. Such a view is illustrated in FIG. 2. As shown in FIG. 2, case base 12 stores N cases, which can each include up to M attributes. In the depicted embodiment, each attribute of a case is described by a property-value pair, where the property corresponds to a category or question related to an experience, and the value provides the experience's value for that property or the answer to the question represented by the property. Of course, in other embodiments, each attribute could include one or more descriptive terms. As illustrated in FIG. 2, each of the N cases in case base 12 is permitted to have a varying number of different, unordered properties, which can each have one or more associated values. In association with each of the N cases, case base 12 stores weight and scoring information for each attribute that is utilized to score the closeness of cases in case base 12 to an input case or "incident." Depending upon implementation, the weight and scoring information can be set individually for each attribute, for each case, or globally for each instance of a particular attribute.

Returning to FIG. 1, CBR system 10 further includes view generator 14, which as described in greater detail below, generates compact views of the contents of case base 12 and stores the views in view storage 16. As utilized herein, the term "view" refers to a compressed representation of one or more of the attributes of a selected set of the cases resident in case base 12. As will become apparent from the description provided below, the views produced by view generator 14 can be searched much more efficiently than case base 12, permitting the rapid identification of one or more cases in case base 12 that best match an incident.

In addition, CBR system 10 includes a user input interface 15 that permits a user to enter a description of an incident. User input interface can comprise, for example, a graphical user interface, a conventional structured query language (SQL) interface, or a textual interface that requests user inputs in response to a series of menus or questions. Inputs received by user input interface 15 are passed to input parser 20, which parses user inputs describing an incident by reference to synonym table 22. The parsed user input produced by input parser 20 is passed to both case manager 18 and search engine 24. Case manager 18 utilizes the parsed input received from input parser 20 to select a particular view from view storage 16. The selected view is then passed to search engine 24, which searches the selected view to identify the case or cases that best match the incident. The best matching case or cases in the view, as determined by the score assigned to each view by search engine 24, are retrieved from case base 12 and passed to solution manager 28 for processing. Solution manager 28 formats the cases retrieved from case base 12 and presents the output cases as a possible solution or action corresponding to the incident. If CBR system 10 is unable to locate a sufficiently close match for the incident within case base 12, case maintenance mechanism 26 saves the incident, and after resolution, formats the incident and enters the incident into case base 12 as a new case.

Figure 3:
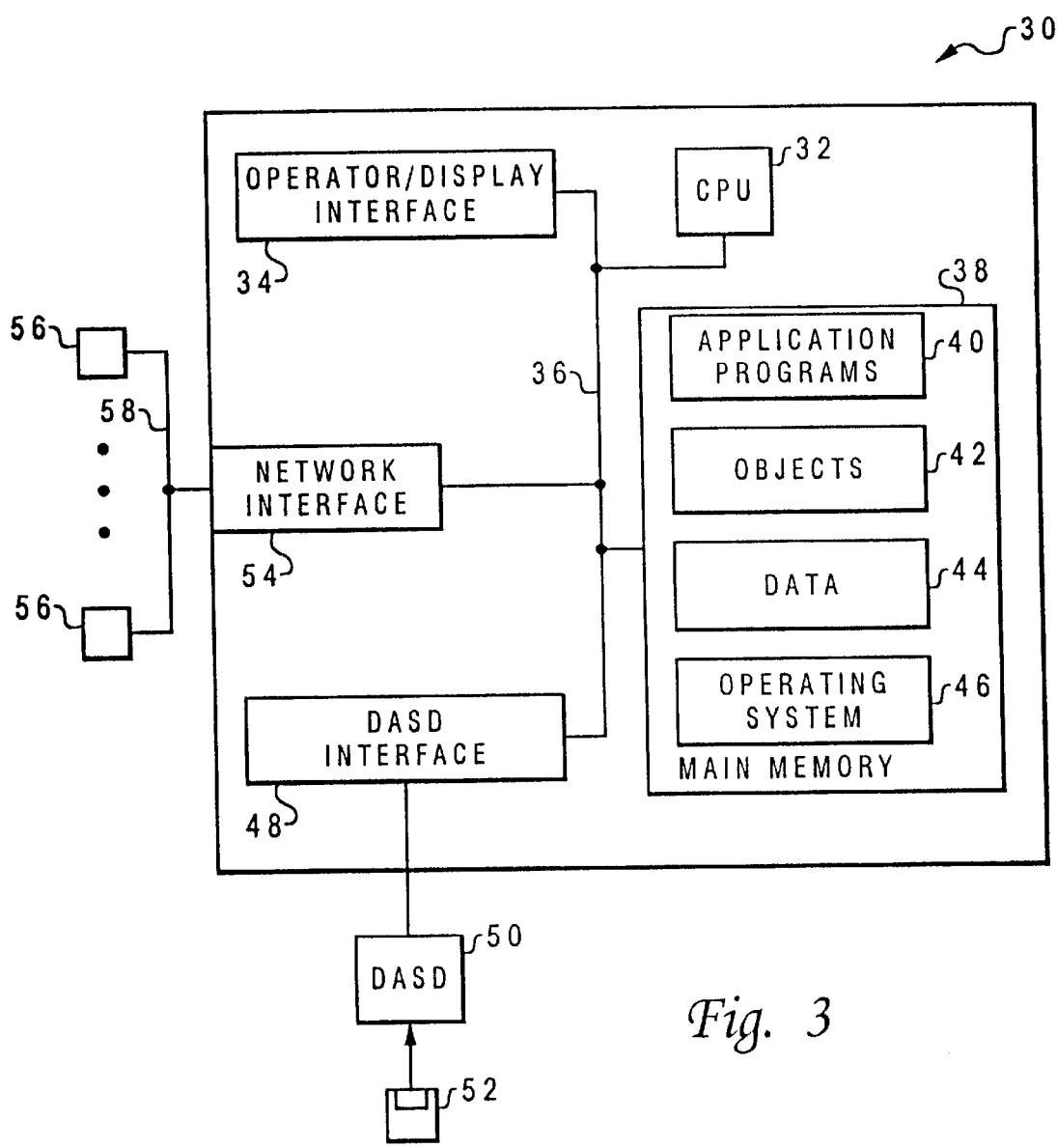
FIG. 3 depicts an illustrative embodiment of a data processing system that may be utilized to implement a CBR system in accordance with the present invention.

CBR system 10 can be implemented within a number of diverse data processing systems utilizing a combination of hardware and software. A high level block diagram of an exemplary data processing system that may be utilized to implement CBR system 10 is depicted in FIG. 3. As illustrated in FIG. 3, computer system 30 includes at least one central processing unit (CPU) 32 that operates in response to operator commands and data, which CPU 32 can receive from an operator/display interface 34 to which CPU 32 is connected by system bus 36. CPU 32 can also receive operator commands and data from main memory 38, which is also coupled to CPU by system bus 36. Although main memory 38 is represented as a single entity, those skilled in the art will appreciate that main memory 38 can comprise a combination of random access memory (RAM), hard disk drives, optical disk drives, and other storage devices containing logically segmented storage locations.

Main memory 38 contains a variety of data structures, including application programs 40, objects 42, data 44, and operating system 46. Operating system 46 preferably supports an object oriented programming environment such as provided, for example, by the C++ programming language. Application programs 40 are invoked, or launched, by a user through operator/display interface 34. Application programs 40, which can include portions of CBR system 10, can be written in a variety of procedural or object oriented programming languages, including C++. Objects 42 are programming data structures of an object oriented programming language, such as C++.

Computer system 30 also includes a direct access storage device (DASD) interface 48 that is connected to system bus 36 and is also connected to DASD 50. Those skilled in the art will appreciate that DASD 50 can receive and read computer program products 52 from, for example, integrated circuit chips, and also machine-readable storage devices such as magnetic media disks, on which are recorded program instructions whose execution implements CBR system 10. The machine-readable storage devices also can comprise, for example, optical disks. Computer system 30 also includes a network interface 54 that permits communication between CPU 32 and other computer systems 56 over a network 58. Computer systems 56 can comprise, for example, computer systems similar in construction to exemplary computer system 30. In that way, computer system 30 can receive data into main memory 38 over network 58 after communication between the computer systems has been established by well-known methods that will understood by those skilled in the art without further explanation.

It is important to note that, while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal-bearing media used to actually carry out the distribution. Examples of signal-bearing media include recordable-type media such as floppy disks and optical disks and transmission-type media such as digital and analog communication links.

Figure 4:
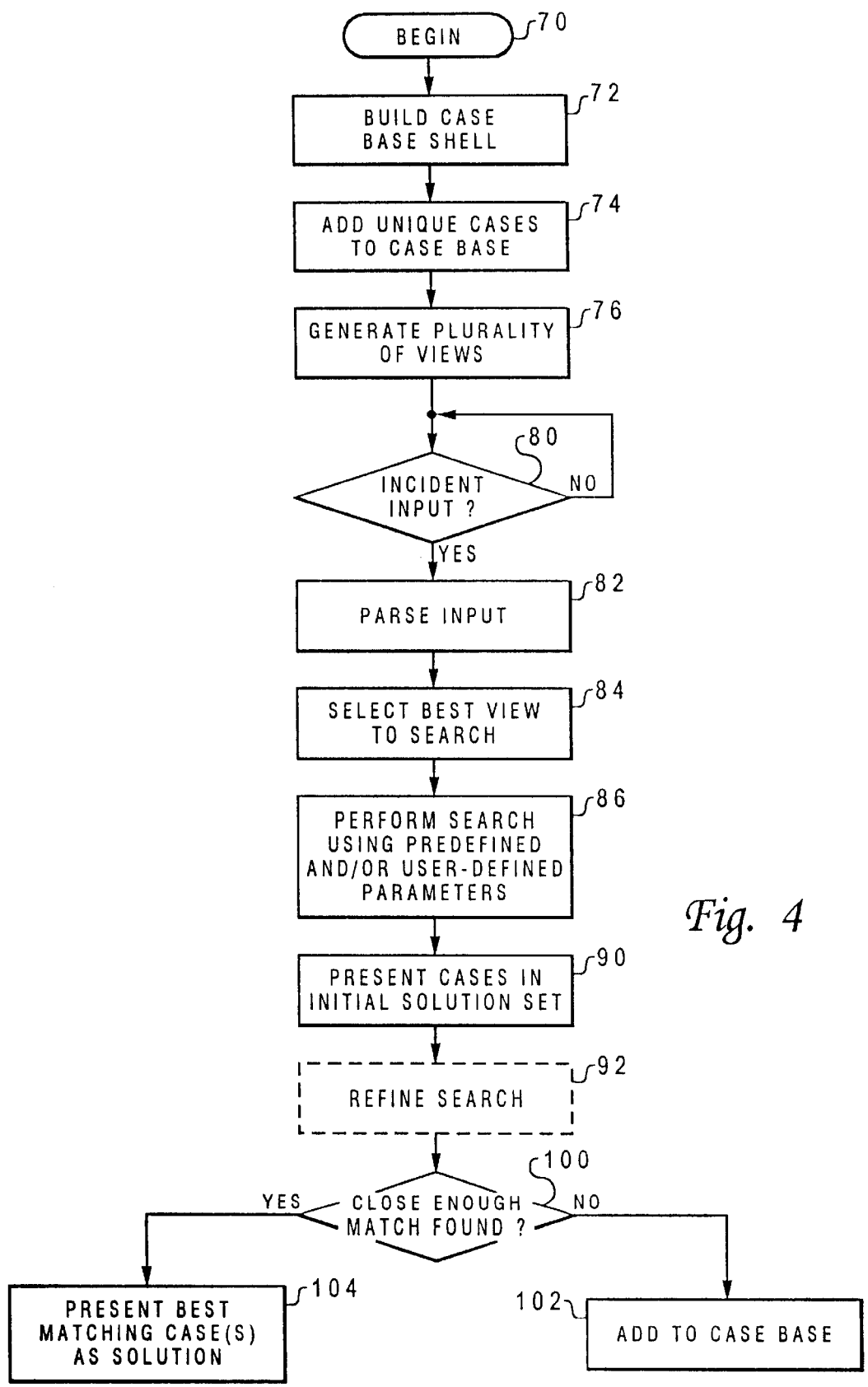
FIG. 4 is a logical flowchart illustrating a process of case-based reasoning in accordance with the present invention.

Referring now to FIG. 4, there is depicted a high level logical flowchart of a case-based reasoning process in accordance with the present invention. As illustrated, the process begins at block 70 and thereafter proceeds to block 72, which illustrates establishing case base 12 by allocating storage in main memory 38. The process then proceeds to block 74, which depicts the addition of unique cases to case base 12. In addition to the attributes (e.g., property-value pairs) that define each case, weight and scoring information is also entered and stored in association with the cases as shown in FIG. 2. Next, the process proceeds from block 74 to block 76, which illustrates the generation of a plurality of views of case base 12 by view generator 14. Views are generated because, while it is possible to search case base 12 directly, such a search is typically inefficient since searches of case base 12 are looking for close rather than exact matches. Accordingly, more compact views of case base 12 are generated in order to decrease the memory footprint of the data that must be searched, accelerating both the loading of the data from non-volatile storage into volatile memory and the search itself. Advantageously, views of case base 12 can be produced by view generator 14 and stored in view storage 16 prior to a user requesting a search in order to accelerate case base searching.

Figure 5:
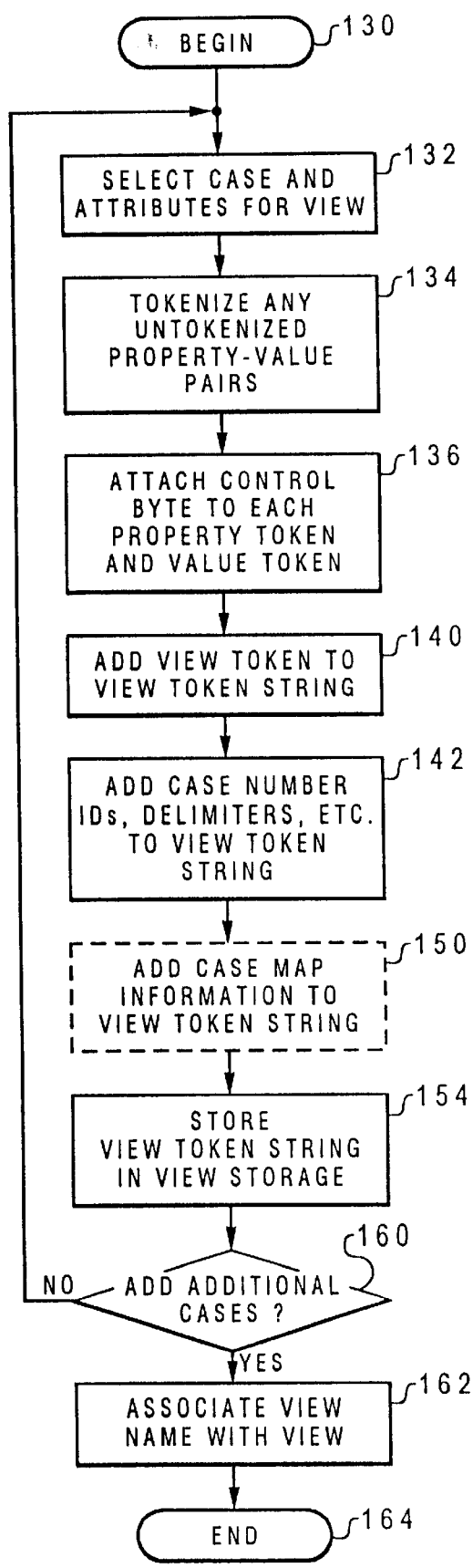
FIG. 5 is a logical flowchart depicting a method for generating a compressed view of a case base in accordance with the present invention.

With reference now to FIG. 5, a high level logical flowchart of a method for generating a view of case base 12 is illustrated. As depicted, the process begins at block 130 and then proceeds to block 132. Block 132 illustrates the selection of a particular case within case base 12 and particular attributes of the selected case for inclusion within the view. The selection of cases and attributes for inclusion within the view is dependent upon the type of view being constructed. A top level view of case base 12 may contain compressed representations of all attributes of all N cases in case base 12. A subsystem level view, on the other hand, may contain representations of all attributes of only the subset of cases related to a particular subsystem or subject matter. An even lower level view may be constrained to include representations of only a few of the possible attributes of the subset of cases related to a particular subsystem or subject matter. For example, if case base 12 stores cases related to automobile repair, a top level view would encompass all cases present in case base 12, a subsystem level view may include all attributes of only cases pertaining to transmission systems, and a low level view may include only a few attributes, such as make, model, and model year, of cases related to transmission systems.

Figure 6:
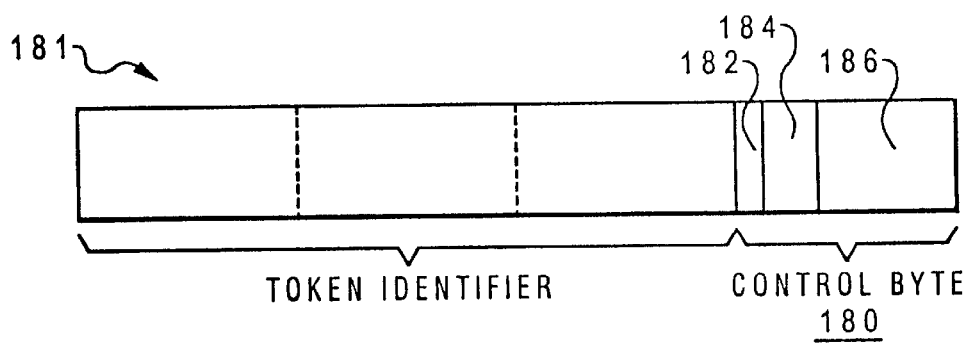
FIG. 6 illustrates a preferred embodiment of a view token within a compressed view of the case base.

The process then proceeds from block 132 to block 134, which depicts converting each untokenized property or value among the selected attributes of the selected case into a token identifier. To perform this conversion, input parser 20 maps input terms to synonymous keywords using synonym table 22. If the keywords are stored in synonym table 22 in tokenized format, keyword tokens from synonym table 22 are utilized as token identifiers. If the keywords are not stored in tokenized format in synonym table 22, input parser 20 converts the keywords to token identifier using separate token tables. In the preferred embodiment illustrated in FIG. 6, property token identifiers and value token identifiers have a uniform length of 3 bytes. In this manner, over 16 million unique token identifier values are possible. Next, at block 136 of FIG. 5, a control byte 180 (see FIG. 6) is attached to each property token identifier and each value token identifier to obtain four-byte tokens 181. Control byte 180 attached at block 136 preferably has one match/mismatch bit 182, two bits of scoring information 184 that can be utilized to specify a particular scoring method, and five bits 186 that represent a match score if the token has a value token identifier and represent a mismatch score if the token has a property token identifier. As shown in block 140 of FIG. 5, once a view token has been produced, the view token is appended to previously processed view tokens to create a view token string.

The process then proceeds from block 140 to block 142, which illustrates the addition of a case number ID to the beginning of the view token string and a view token string delimiter to the end of the view token string. Other additional information may optionally be added to the view token string, such as case map information, as illustrated at block 150. The process then proceeds to block 154, which illustrates view generator 14 storing the view token string in view storage 16. A determination is then made at block 160 whether or not attributes of additional cases are to included in the view. If so, the process returns to block 132, which has been described. Any additional view tokens produced by processing additional cases are appended to the view token string with appropriate case IDs and case delimiters. However, in response to a determination at block 160 that all cases to be included within the view have been processed, the process passes to block 162, which illustrates view generator 14 associating a view name and optionally a revision number with the view in view storage 16. Thereafter, the process terminates at block 164 and returns to FIG. 4.

Referring again to FIG. 4, the process then proceeds from block 76 to block 80, which illustrates a determination by input parser 20 of whether or not an incident has been received from user input interface 15. An incident having the same general attribute format of cases in case base 12 may be input by a user in a number of different ways, including by SQL query, by answering diagnostic questions posed by user input interface 15, by downloading the incident via network interface 54, by inputting the incident from diskette 52, or through an alternative means. If no input incident is detected by input parser 20, the process simply iterates at block 80 until such time as an incident is input by the user. Then, in response to detection of an input incident, the process passes from block 80 to block 82, which depicts input parser 20 parsing the incident by reference to synonym table 22. In a preferred embodiment of the present invention, input parser 20 parses an incident by first converting all words to upper case, removing any words separators, and discarding ignored words (e.g., "a," "and," "the," and "to") based upon a table of ignored words. Any remaining descriptive terms in the user's input are converted into keywords that are stored as 3-byte input tokens in synonym table 22. Finally, any remaining non-descriptive inputs, such as values, are converted into 3-byte input tokens. Several advantages arise from the operation of input parser 20. First, because all input terms are converted into input tokens, search engine 24 need only perform exact word matching between the input tokens and the token identifier portion of the view tokens, which is the simplest type of matching operation to perform. Moreover, because all input tokens have a uniform length, preferably smaller than the internal registers of CPU 32, a search can be performed by simple register comparison. A further advantage is that synonym table 22 can be utilized to support multi-national language translation. In other words, synonym table 22 can be loaded with tokenized English keywords that correspond to foreign language descriptive inputs. In this manner, an English (or other selected) language case base 12 can support any language in the world with the appropriate set of synonym tables 22.

Following block 82, the process proceeds to block 84. Block 84 depicts rule-based case manager 18 utilizing the parsed output of input parser 20 to select a view to be searched from view storage 16. Although the rules utilized by case manager 18 to select a view from view storage 16 are implementation-dependent, case manager 18 preferably selects a best view to be searched, at least in part, based upon which attributes are present within the incident. Utilizing the view selected by case manager 18, search engine 24 compares each input token within the output of input parser 20 with view tokens in the selected view, as depicted at block 86. In the simplest case, each input token is compared against every view token, and the match bits of matching view tokens are set. In embodiments in which an additional control bit is utilized to permit search engine 24 to distinguish between property and value tokens, additional performance may be gained by comparing only property input tokens with property view tokens and value input tokens with value view tokens.

Search engine 24 completes the search depicted at block 86 by scoring each of the cases in the view. Although the closeness of the cases in the view to the incident can be scored in a variety of ways (which can be selected by the two bits of scoring information 184 in the control bytes 180 of the view tokens of a case), a preferred method of scoring calculates a score for each case in a view individually according to the equation:

$$Ps=(\Sigma_1(Wm*Pm)+\Sigma_2(WU*Pu)+\Sigma_3(Wa*Pa))/\Sigma_4(Wmt*Pt)$$

where Ps is the total score for the case, $\Sigma_1$ is a summation performed over all property view tokens that match an property input token and have an associated value view token that matches the corresponding value input token, $\Sigma_2$ is a summation performed over all value view tokens that have an associated property view token that matches a property input token and that do not match the associated value input token, $\Sigma_3$ is a summation performed over all property input tokens having no match, $\Sigma_4$ is a summation over all property view tokens in the case, Wm is a match weight associated with a value view token, Pm is a percent contribution term for the matching value view token, Wu is a mismatch weight associated with a particular value view token, Pu is a percent contribution term for the mismatching value view token, Wa is an absent weight associated with a particular property input token, Pa is a global absent term percent contribution applicable to all property input tokens, Wmt is the maximum weight of each property view token, and Pt is the percent contribution of each property view token in the current case. Table I contains an exemplary case base 12 and the raw and adjusted (i.e., normalized) scores of each case when performing property matching utilizing the incident "A1 B1."

TABLE I

| case no. | case terms | raw score (Wm = 10, Wu = −5, & Wa = −1) | adj. score |
|---|---|---|---|
| 1 | A1 | 9/10 = .90 | .95 |
| 2 | A1 B1 | 20/20 = 1.0 | 1.0 |

TABLE I-continued

| case no. | case terms | raw score (Wm = 10, Wu = −5, & Wa = −1) | adj. score |
|---|---|---|---|
| 3 | A1 B0 | 5/20 = 0.25 | .625 |
| 4 | A0 B0 | −10/20 = −0.5 | .25 |
| 5 | A1 B1 C1 | 20/30 = 0.6 | .83 |
| 6 | A1 B0 C1 | 5/30 = .16 | .58 |
| 7 | A1 C1 | 9/20 = .45 | .724 |

The adjusted scores in Table I are computed from the raw scores according to the equation (Ps+1)/2 in order to normalize all scores to values between 0 and 1. Based upon the above-described scoring method, the highest scoring cases will represent the closest matching cases in the view. Thus, as an exact match, case 2 receives the highest score, and case 1 receives the second highest score as the next best match. Preferably, user-defined inputs will be utilized to establish threshold and maximum value parameters that respectively determine the lowest permissible closely matching score and the maximum number of top scoring cases to be returned. While the scoring method described above is preferred when scoring cases in which the attributes comprise property-value pairs, alternative methods of scoring may be preferable in other embodiments. Such alternative scoring methods are disclosed in copending application Ser. No. 09/001,083, is now U.S. Pat. No. 6,021,411 entitled "CASE-BASED REASONING SYSTEM AND METHOD FOR SCORING CASES IN A CASE DATABASE," which is filed of even date herewith and incorporated herein by reference.

The process illustrated in FIG. 4 then proceeds to block 90, which depicts search engine 24 passing the case IDs of the top scoring case(s) to case base 12, which outputs the identified case(s) to solution manager 28. As shown at block 92, at this point solution manager 28 may prompt the user for additional input if the scores of the output cases indicate that none of the output cases was sufficiently close to the incident or may prompt case manager 18 to select another view to be searched if an insufficient number of substantially close cases were located. As illustrated at block 100, if at the conclusion of the initial search and any additional refined searches a determination is made that no cases closely match the incident, case maintenance mechanism 26 will correctly format the incident and any resolution provided and add the incident to case base 12. However, in response to a determination that one or more best matching cases were identified by search engine 24, solution manager 28 presents the best matching case or cases to the user as a solution or proposed action to be taken. Thereafter, the case-based reasoning process illustrated in FIG. 4 terminates at block 164.

As has been described, the present invention provides an improved CBR system that generates compact views of a case base. By searching the views of the case base rather than the case base itself, a search engine is able to rapidly identify one or more cases in the case base that best match an incident.

While the invention has been particularly shown and described with reference to a preferred embodiment, it will be understood by those skilled in the art that various changes in form and detail may be made therein without departing from the spirit and scope of the invention.

What is claimed is:

1. A case-based reasoning system, comprising:
   a case base capable of storing a plurality of cases that each include one or more attributes;
   a view generator that generates a view of said case base by representing each case within at least a selected subset of said plurality of cases within said case base as one or more view tokens, all view tokens in said view having a uniform length;
   an input parser that provides a tokenized representation of an input incident, said tokenized representation including one or more input tokens; and
   a search engine that compares said input tokens with said view tokens to identify one or more closely matching cases within said view, wherein said one or more closely matching cases are efficiently located by searching said view rather than directly searching said case base.

2. The case-based reasoning system of claim 1, and further comprising a solution manager that presents said one or more closely matching cases to a user.

3. The case-based reasoning system of claim 1, wherein:
   said view generator generates a plurality of views of said case base; and
   said case-based reasoning system further comprises a case manager that selects one of said plurality of views as a selected view to be searched by said search engine prior to searching any other of said plurality of views.

4. The case-based reasoning system of claim 3, said plurality of views of said case base generated by said view generator comprising a first view including all attributes of said all cases in said at least said subset and a second view including fewer than all said attributes of all said cases in said at least said subset.

5. The case-based reasoning system of claim 1, wherein said view generator generates said view prior to receipt of said input incident by said input parser.

6. The case-based reasoning system of claim 1, each view token having associated therewith scoring information, wherein said search engine utilizes said scoring information to calculate a score for each case in said view and determines said one or more closely matching cases based upon said scores.

7. The case-based reasoning system of claim 6, wherein:
   said view comprises a first view;
   said view generator generates a second view of said case base; and
   said search engine searches said second view if a highest ranking score of any case in said first view is below a selected threshold.

8. The case-based reasoning system of claim 1, said search engine performing only exact word matching between said input tokens and said view tokens.

9. The case-based reasoning system of claim 1, said input parser including a synonym table correlating textual inputs and keywords, wherein said input parser converts said textual inputs into keywords by reference to said synonym table.

10. The case-based reasoning system of claim 9, each of said keywords in said synonym table comprising a uniform length input token.

11. The case-based reasoning system of claim 9, each of said attributes comprising a property having one or more values associated therewith.

12. A method of case-based reasoning, said method comprising:
    storing, in a case base, a plurality of cases that each include one or more attributes;
    generating a view of said case base by representing each case within at least a selected subset of said plurality of cases within said case base as one or more view tokens, all view tokens in said view having a uniform length;
    providing a tokenized representation of an input incident, said tokenized representation including one or more input tokens; and
    comparing said input tokens with said view tokens to identify one or more closely matching cases within said view, wherein said one or more closely matching cases are efficiently located by searching said view rather than directly searching said case base.

13. The method of claim 12, and further comprising presenting said one or more closely matching cases to a user.

14. The method of claim 12, wherein said generating step comprises generating a plurality of views of said case base, said method further comprising:
    selecting one of said plurality of views as a first view to process in response to said input tokens.

15. The method of claim 14, said step of generating a plurality of views of said case base comprising generating a first view including all properties of all cases in said at least said subset and generating a second view including fewer than all said properties of all said cases in said at least said subset.

16. The method of claim 12, said generating step being performed prior to said providing step.

17. The method of claim 12, each view token having associated therewith scoring information, said comparing step comprising:
    calculating a score for each case in said view utilizing said scoring information; and
    determining said one or more closely matching cases based upon scores of cases in said view.

18. The method of claim 17, said view comprising a first view, wherein said generating step includes generating a second view of said case base, said method further comprising:
    comparing said input tokens with said view tokens in said second view to identify one or more closely matching cases within said second view, if a highest ranking score of any case in said first view is below a selected threshold.

19. The method of claim 12, said comparing step comprising performing only exact word matching between said input tokens and said view tokens.

20. The method of claim 12, and further comprising converting textual inputs into keywords by reference to a synonym table that correlates textual inputs and keywords.

21. The method of claim 20, and further comprising storing each of said keywords in said synonym table as a uniform length input token.

22. The method of claim 12, wherein said storing step comprises storing, in a case base, a plurality of cases that each include one or more attributes, wherein each of said attributes includes a property having one or more value associated therewith.

23. A program product that can be utilized by a data processing system to implement a case-based reasoning system, said data processing system including a case base capable of storing a plurality of cases that each include one or more attributes, said program product comprising:
    a view generator that causes said data processing system to generate a view of said case base by representing each case within at least a selected subset of said plurality of cases within said case base as one or more view tokens, all view tokens in said view having a uniform length;

an input parser that causes said data processing system to provide a tokenized representation of an input incident, said tokenized representation including one or more input tokens; and a search engine that causes said data processing system to compare said input tokens with said view tokens to identify one or more closely matching cases within said view, wherein said one or more closely matching cases are efficiently located by searching said view rather than directly searching said case base; and a signal-bearing medium bearing said view generator, said input parser, and said search engine.

24. The program product of claim 23, and further comprising a solution manager within said signal-bearing medium that causes said data processing system to present said one or more closely matching cases to a user.

25. The program product of claim 23, wherein:

said view generator generates a plurality of views of said case base; and said program product further comprises a case manager, within said signal-bearing medium, that causes said data processing system to select one of said plurality of views as a selected view to be searched by said search engine prior to searching any other of said plurality of views.

26. The program product of claim 25, said plurality of views of said case base generated by said view generator comprising a first view including all properties of said all cases in said at least said subset and a second view including fewer than all said properties of all said cases in said at least said subset.

27. The program product of claim 23, wherein said view generator causes said data processing system to generate said view prior to receipt of said input incident by said input parser.

28. The program product of claim 23, each view token having associated therewith scoring information, wherein said search engine causes said data processing system to utilize said scoring information to calculate a score for each case in said view and determines said one or more closely matching cases based upon said scores.

29. The program product of claim 28, wherein:

said view comprises a first view;

said view generator causes said data processing system to generate a second view of said case base; and said search engine causes said data processing system to search said second view if a highest ranking score of any case in said first view is below a selected threshold.

30. The program product of claim 23, said search engine causing said data processing system to perform only exact word matching between said input tokens and said view tokens.

31. The program product of claim 23, said program product including a synonym table correlating textual inputs and keywords, wherein said input parser causes said data processing system to convert said textual inputs into keywords by reference to said synonym table.

32. The program product of claim 31, each of said keywords in said synonym table comprising a uniform length input token.

* * * * *